(12) United States Patent
Zhang et al.

(10) Patent No.: US 10,119,735 B2
(45) Date of Patent: Nov. 6, 2018

(54) ELECTRONIC EXPANSION VALVE

(71) Applicant: Gree Electric Appliances, Inc. of ZHUHAI, Zhuhai, Guangdong (CN)

(72) Inventors: Yaguo Zhang, Zhuhai (CN); Peigang Song, Zhuhai (CN); Yunyu Su, Zhuhai (CN); Wu Li, Zhuhai (CN)

(73) Assignee: GREE ELECTRIC APPLIANCES, INC. OF ZHUHAI, Zhuhai, Guangdong (CN)

( * ) Notice: Subject to any disclaimer, the term of this patent is extended or adjusted under 35 U.S.C. 154(b) by 228 days.

(21) Appl. No.: 15/032,545

(22) PCT Filed: Oct. 17, 2014

(86) PCT No.: PCT/CN2014/088861
§ 371 (c)(1),
(2) Date: Apr. 27, 2016

(87) PCT Pub. No.: WO2015/062422
PCT Pub. Date: May 7, 2015

(65) Prior Publication Data
US 2016/0258660 A1    Sep. 8, 2016

(30) Foreign Application Priority Data

Oct. 28, 2013 (CN) .......................... 2013 1 0518177
Oct. 28, 2013 (CN) .......................... 2013 1 0518283

(51) Int. Cl.
*F25B 41/06* (2006.01)
*F16K 31/06* (2006.01)
(Continued)

(52) U.S. Cl.
CPC .............. *F25B 41/062* (2013.01); *F16K 1/12* (2013.01); *F16K 31/04* (2013.01); *F16K 31/047* (2013.01);
(Continued)

(58) Field of Classification Search
CPC .. F16K 47/04; F16K 31/0693; F16K 31/0658; F16K 47/08; F16K 31/0644;
(Continued)

(56) References Cited

U.S. PATENT DOCUMENTS 3,160,540 A  * 12/1964 Barlow ................... B29C 65/02
                                                       156/274.4
6,548,837 B1 *  4/2003 Vaz De Azevedo ........................
                                                       F02M 25/0836
                                                       123/520
(Continued)

FOREIGN PATENT DOCUMENTS

CN       CN 2655131 Y    11/2004
CN          1566728 A     1/2005
(Continued)

OTHER PUBLICATIONS

European Patent Office, European patent search report dated May 10, 2017.

*Primary Examiner* — Ana Vazquez
(74) *Attorney, Agent, or Firm* — Li & Cai Intellectual Property (USA) Office

(57) ABSTRACT

The invention discloses an electronic expansion valve. The electronic expansion valve includes: a valve body (10), a first chamber being formed in the valve body (10), a liquid inlet (11) and a liquid outlet (12) being oppositely provided at two ends of the valve body (10); a second chamber, provided in the first chamber, a coil (20) being provided in the second chamber; a third chamber, an inlet end of the third chamber being communicated with the liquid inlet (11), an outlet end of the third chamber being communicated with the liquid outlet (12), the inlet end of the third chamber and the outlet end of the third chamber being coaxially provided, and a valve core (31) being provided in the third (Continued)

chamber; and the first chamber being communicated with the liquid inlet (11) via the first liquid passage hole (33).

8 Claims, 4 Drawing Sheets

(51) Int. Cl.
*F16K 31/04* (2006.01)
*F16K 31/50* (2006.01)
*F16K 47/04* (2006.01)
*F16K 47/08* (2006.01)
*F16K 1/12* (2006.01)

(52) U.S. Cl.
CPC ...... *F16K 31/0644* (2013.01); *F16K 31/0651* (2013.01); *F16K 31/0655* (2013.01); *F16K 31/0658* (2013.01); *F16K 31/0693* (2013.01); *F16K 31/504* (2013.01); *F16K 47/04* (2013.01); *F16K 47/08* (2013.01); *F25B 2341/0653* (2013.01); *Y02B 30/72* (2013.01)

(58) Field of Classification Search
CPC ............. F16K 31/047; F16K 31/0655; F16K 31/0651; F16K 31/504; F25B 2341/0653; F25B 41/062; Y02B 30/72
See application file for complete search history.

(56) References Cited

U.S. PATENT DOCUMENTS

| | | | | |
|---|---|---|---|---|
| 8,684,036 | B1* | 4/2014 | Satoda | F16K 27/029 |
| | | | | 137/375 |
| 2001/0023686 | A1* | 9/2001 | Okamoto | F02B 31/06 |
| | | | | 123/490 |
| 2003/0146406 | A1* | 8/2003 | Yamaguchi | C04B 35/468 |
| | | | | 252/62.9 R |
| 2003/0160673 | A1* | 8/2003 | Ott | F16K 31/0606 |
| | | | | 335/256 |
| 2009/0212244 | A1* | 8/2009 | Pfaff | F15B 13/0405 |
| | | | | 251/30.03 |

FOREIGN PATENT DOCUMENTS

| | | | | |
|---|---|---|---|---|
| CN | CN 102913678 A | | 2/2013 | |
| CN | CN 202835954 U | | 3/2013 | |
| CN | CN 103185426 A | | 7/2013 | |
| CN | 203516797 U | | 4/2014 | |
| CN | 203516798 U | | 4/2014 | |
| EP | 0625684 A1 | | 11/1994 | |
| FR | 2671597 A1 | | 7/1992 | |
| JP | 2005207574 A | | 8/2005 | |
| JP | WO 2013103061 A1 * | | 7/2013 | ............ F25B 41/062 |
| SU | 844886 A1 | | 7/1981 | |
| WO | WO 201114992 A1 | | 9/2011 | |
| WO | WO 2012/048594 A1 | | 4/2012 | |

* cited by examiner

ELECTRONIC EXPANSION VALVE

TECHNICAL FIELD OF THE INVENTION

The invention relates to the field of air conditioners, and in particular to an electronic expansion valve.

BACKGROUND OF THE INVENTION

A throttling element is an important component of a refrigerating system. Common throttling elements include a capillary pipe, a thermodynamic expansion valve and an electronic expansion valve. The electronic expansion valve, serving as the throttling element, tends to be widely applied to an air conditioner refrigerating system due to the advantages of high reaction speed, accuracy, high precision and the like. An angle of 90° exists between a coolant inflow pipe and an outflow pipe in a conventional electronic expansion valve structure, and therefore the electronic expansion valve may be mounted in an outdoor unit or an indoor unit of an air conditioner ordinarily. For a multi-split system, the electronic expansion valve is often mounted inside an indoor unit of a refrigerating system or is provided at a place, inside a dedicated mounting box not far away from the indoor unit, out of the indoor unit, which may have the problems as follows. When the electronic expansion valve is provided in the indoor unit, the noise is high, the occupied space is large, and the assembly efficiency is low. When the electronic expansion valve is provided in the mounting box out of the indoor unit, the appearance is influenced, and the mounting cost and the maintenance cost are high. An angle between a coolant outlet and a coolant inlet of a conventional electronic expansion valve is 90° ordinarily, and the flow resistance and the on-way pressure loss are high.

SUMMARY OF THE INVENTION

The invention aims to provide an electronic expansion valve, which is intended to solve the technical problem that the liquid on-way pressure loss of the conventional electronic expansion valve.

In order to achieve the aim, the invention provides an electronic expansion valve, which comprising: a valve body, a first chamber being formed in the valve body, a liquid inlet and a liquid outlet being oppositely provided at two ends of the valve body, and the liquid inlet and the liquid outlet being coaxially provided along a central axis of the valve body; a second chamber, provided in the first chamber, a coil being provided in the second chamber; a third chamber, running through the second chamber, an inlet end of the third chamber being communicated with the liquid inlet, an outlet end of the third chamber being communicated with the liquid outlet, the inlet end of the third chamber and the outlet end of the third chamber being coaxially provided, and a valve core capable of moving along the central axis being provided in the third chamber; and a first liquid passage hole, provided in a chamber wall of the third chamber, the first chamber being communicated with the liquid inlet via the first liquid passage hole.

Furthermore, a second liquid passage hole extending in parallel to the central axis is provided in the valve core.

Furthermore, a sliding rail slot is provided in the chamber wall of the third chamber, and the valve core slides along the sliding rail slot.

Furthermore, an oil storage hole is provided in an inner wall of the sliding rail slot.

Furthermore, a reset spring abutting against the valve core is provided on an inner chamber wall of the third chamber.

Furthermore, a seal end cover plate is provided at a first end of the second chamber.

Furthermore, a seal ring is provided at an outlet end of the third chamber.

Furthermore, a location snap ring configured to locate the reset spring is provided in the third chamber.

Furthermore, the liquid inlet and the liquid outlet are each provided with a filter internally.

Furthermore, the electronic expansion valve may further comprises a controller, configured to control the magnitude and the time of an energizing current of the coil.

The invention also provides an electronic expansion valve, comprising: a valve body, a first chamber being formed in the valve body, a liquid inlet and a liquid outlet being oppositely provided at two ends of the valve body, and the liquid inlet and the liquid outlet being coaxially provided along a central axis of the valve body; a coil, sleeved at an outer side of a chamber wall of the first chamber; a second chamber, provided in the first chamber, an inlet end of the second chamber being communicated with the liquid inlet, an outlet end of the second chamber being communicated with the liquid outlet, the inlet end of the second chamber and the outlet end of the second chamber being coaxially provided, and a valve core capable of moving along the central axis being provided in the second chamber; and a first liquid passage hole, provided in a chamber wall of the second chamber, the first chamber being communicated with the liquid inlet via the first liquid passage hole.

Furthermore, a second liquid passage hole extending in parallel to the central axis is provided in the valve core.

Furthermore, the electronic expansion valve further comprising a stator and a rotor rotating with respect to each other, the stator being provided outside the second chamber, and the valve core is connected with the rotor so as to rotate with respect to the stator along with the rotor.

Furthermore, the rotor is a permanent magnet rotor.

Furthermore, the stator is in thread engagement with the rotor.

Furthermore, the coil is an open coil.

Furthermore, the coil is provided with an insulating layer.

Furthermore, the electronic expansion valve may further include an end cover plate, and the valve core may be connected to the rotor via the end cover plate.

Furthermore, the electronic expansion valve further comprising a controller, configured to control the magnitude and the time of an energizing current of the coil.

Furthermore, the liquid inlet and the liquid outlet are each provided with a filter internally.

The invention has the beneficial effects as follows.

By keeping a movement direction of liquid in the valve body and an in-out direction of the liquid with respect to the valve body in a straight line, the flow resistance of the liquid and the on-way pressure loss can be effectively reduced. Meanwhile, the noise problem can be solved, the valve is simple to mount, the cost is reduced, and the efficiency is improved.

In addition to the aims, features and advantages described above, the invention also has other aims, features and advantages. The invention will be further described below in detail with reference to the drawings.

BRIEF DESCRIPTION OF THE DRAWINGS

The drawings forming a part of the invention are intended to provide further understanding of the invention. The schematic embodiments and descriptions of the invention are intended to explain the invention, and do not form improper limits to the invention. In the drawings.

Figure 1:
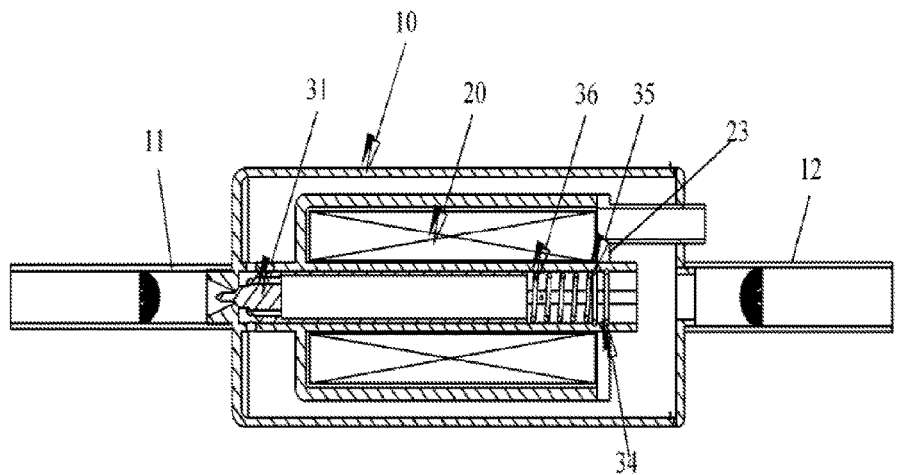
FIG. 1 is a schematic diagram of a normally closed state of a valve needle when an electronic expansion valve does not work according to an embodiment of the invention.

The drawings include the following drawing marks:

10, valve body; 11, liquid inlet; 12, liquid outlet; 20, coil; 21, stator; 22, rotor; 23, end cover plate; 24, lead interface; 25, insulating layer; 26, fixed structure; 31, valve core; 311, second liquid passage hole; 32, sliding rail slot; 321, oil storage hole; 33, first liquid passage hole; 34, seal ring; 35, location snap ring; and 36, reset spring.

DETAILED DESCRIPTION OF THE EMBODIMENTS

The embodiments of the invention are described below in detail with reference to the drawings. However, the invention can be implemented in multiple different modes limited and covered by claims.

As shown in FIG. 1 to FIG. 5, according to the invention, an electronic expansion valve is provided, which comprises: a valve body 10, a first chamber being formed in the valve body 10, a liquid inlet 11 and a liquid outlet 12 being oppositely provided at two ends of the valve body 10, and the liquid inlet 11 and the liquid outlet 12 being coaxially provided along a central axis of the valve body 10; a second chamber, provided in the first chamber, a coil 20 being provided in the second chamber; a third chamber, running through the second chamber, an inlet end of the third chamber being communicated with the liquid inlet 11, an outlet end of the third chamber being communicated with the liquid outlet 12, the inlet end of the third chamber and the outlet end of the third chamber being coaxially provided, and a valve core 31 capable of moving along the central axis being provided in the third chamber; and a first liquid passage hole 33, provided in a chamber wall of the third chamber, the first chamber being communicated with the liquid inlet 11 through the first liquid passage hole 33. The first liquid passage hole 33 is provided in the third chamber, the first liquid passage hole 33 is provided at a fitted seal position of the valve core 31 and the inlet end of the third chamber, and the first chamber is communicated with the liquid inlet 11 via the first liquid passage hole 33. The third chamber is a liquid flow channel, and the first chamber and the third chamber are communicated via 4 to 6 uniform first liquid passage holes 33. The valve body 10 may be integrated or may be formed by welded connection. The electronic expansion valve can be mounted in a connecting pipe of an outdoor unit of an air conditioner. A flow direction of liquid, a movement direction of the valve core 31, an inlet pipe and an outlet pipe are in a straight line. Flowing comprising one-way flowing and two-way flowing is more stable and more uniform. By keeping the movement direction of the liquid in the valve body and an in-out direction of the liquid with respect to the valve body in the straight line, the flow resistance of the liquid and the on-way pressure loss can be effectively reduced. Meanwhile, the noise problem can be solved, the valve is simple to mount, the cost is reduced, and the efficiency is improved.

Figure 4:
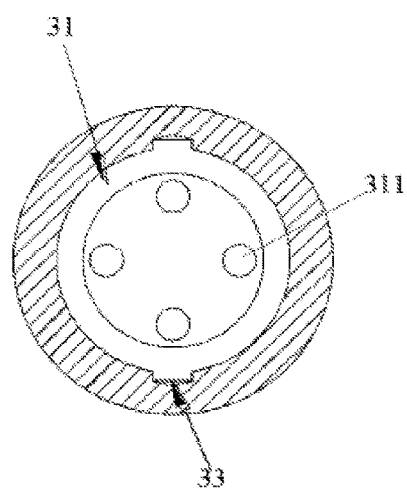
FIG. 4 is a schematic diagram of sectional fit between a valve core and a sliding location structure of an electronic expansion valve according to an embodiment of the invention.

As shown in FIG. 4, the third chamber is a movement chamber of the valve core 31, sliding location structures (such as guide rail slots, sliding slots or dovetail slots) are symmetrically provided on an inner chamber wall of the third chamber, and oil storage holes 321 or oil storage slots are provided in the inner chamber wall of the third chamber. The sliding location structures achieve the location and movement guidance of the valve core 31, and ensure that the valve core 31 is steady in a movement process and does not rotate radially. A sliding rail slot 32 is provided in the third chamber, and the valve core 31 slides along the sliding rail slot 32. Oil storage holes 321 are provided in an inner wall of the sliding rail slot 32. The sliding rail slot 32 and the oil storage holes 321 form a clearance space when the valve core 31 fits therewith, thereby aiding in storage of lubricating oil, and keeping the valve core 31 in a good lubricating state constantly.

Figure 2:
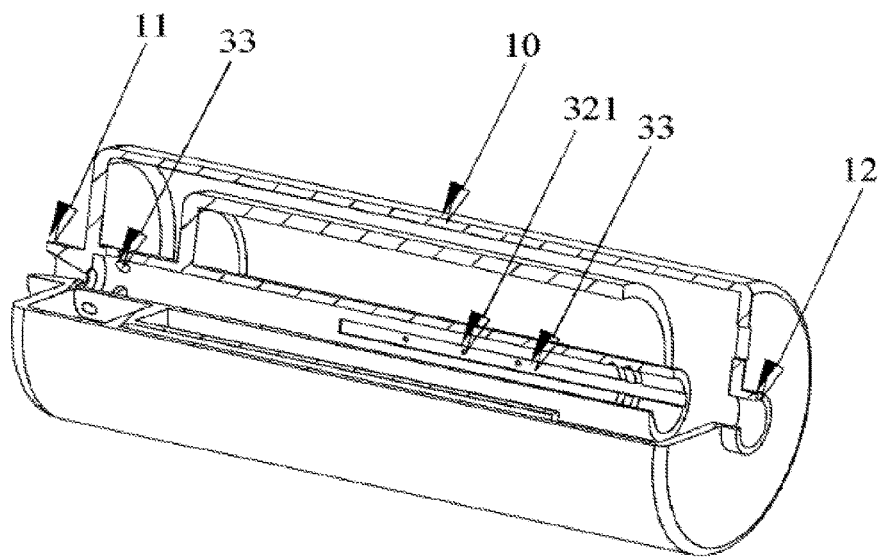
FIG. 2 is a part section view of an electronic expansion valve according to an embodiment of the invention.

As shown in FIG. 1 and FIG. 2, a reset spring 36 abutting against the valve core 31 is provided in the third chamber. A seal ring mounting slot is provided in the third chamber. Specifically, the seal ring mounting slot is provided at the outlet end of the third chamber and is configured to mount a seal ring 34. A location snap ring 35 configured to locate the reset spring 36 is provided in the third chamber.

As shown in FIG. 2, the valve core 31 seals the inlet end of the third chamber and a second liquid passage hole 311 extending in parallel to the central axis is provided in the valve core 31. The second liquid passage hole 311 is provided at a fitted seal position of the valve core 31 and the inlet end of the third chamber, and the movement direction of the valve core 31 and the flow direction of liquid passing through the second liquid passage hole 311 are in the same straight line.

The valve core 31 is made of a magnetic material, and the second liquid passage hole 311 in a conical surface of the valve core 31 communicate the liquid inlet 11 with a cavity of the valve core 31. There are two advantages. Firstly, when the valve core 31 is opened, the liquid can enter the valve body 10 through the second liquid passage hole 311, thereby quickly balancing the pressures of two ends of the valve core 31, reducing the movement resistance of the valve core 31 and the impact of the liquid on the valve core 31, and making the valve core 31 move more steadily. Secondly, a liquid flow channel can be formed, and due to a straight line type flow mode, the energy loss is extremely low and the noise is lower.

As shown in FIG. 1 and FIG. 2, the second chamber is a coil mounting area. An end cover plate 23 is provided at a first end of the second chamber. Specifically, the second chamber can be sealed by an end cover. Meanwhile, a seal wiring apparatus is provided on the end cover and is configured to connect the coil and an outdoor power supply so as to ensure that the power supply normally supplies power to the coil.

Figure 5:
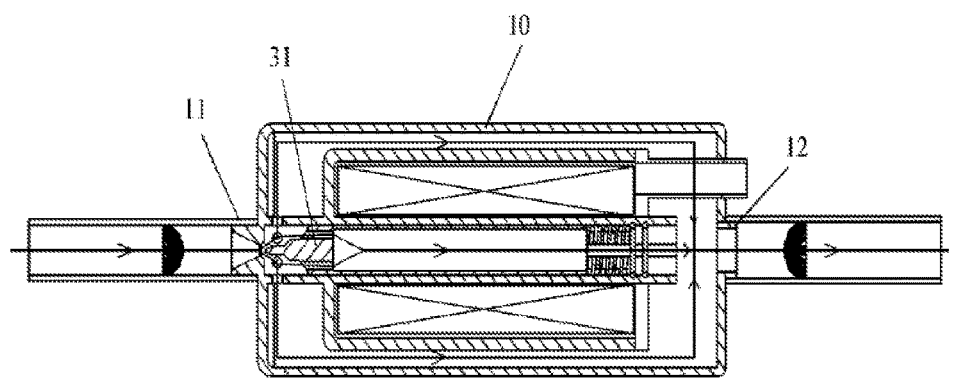
FIG. 5 is a schematic diagram of a liquid flow direction of an electronic expansion valve according to an embodiment of the invention.

As shown in FIG. 1 and FIG. 5, the electronic expansion valve further comprises a controller, configured to control the magnitude and time of an energizing current of the coil 20. A valve core drive mode adopts an electromagnetic drive mode. The working process is as follows. When the electronic expansion valve does not work, the coil 20 is de-energized, and the valve core is dosed under an action of the reset spring. When the electronic expansion valve needs to conduct flow adjustment for a system, the coil is energized to generate an interaction between an electromagnetic force and the valve core 31 made of a magnet. When an electromagnetic force F1 is greater than a resistance sum F2 (an elastic force and a friction force of the reset spring 36) needing to be overcome by the movement of the valve core, the valve core 31 starts to move so as to increase the openness. Otherwise, when the electromagnetic force F1 is smaller than the resistance sum F2 needing to be overcome by the movement of the valve core, the valve core starts to move so as to decrease the openness, and the flow adjustment is completed. The movement stroke of the valve core 31 can be accurately controlled by the magnitude and pulse count of a pulse current exerted on the coil.

As shown in FIG. 1 and FIG. 5, the liquid inlet 11 and the liquid outlet 12 are each provided with a filter internally. Preferably, a filter apparatus is provided on each of an inlet pipe and an outlet pipe thereof, thereby realizing liquid filtration. Furthermore, structures connected to a copper pipe such as pipe sockets and pipe nuts are provided on the inlet pipe and the outlet pipe, and a structure in direct welded connection with the copper pipe is also included.

Figure 3:
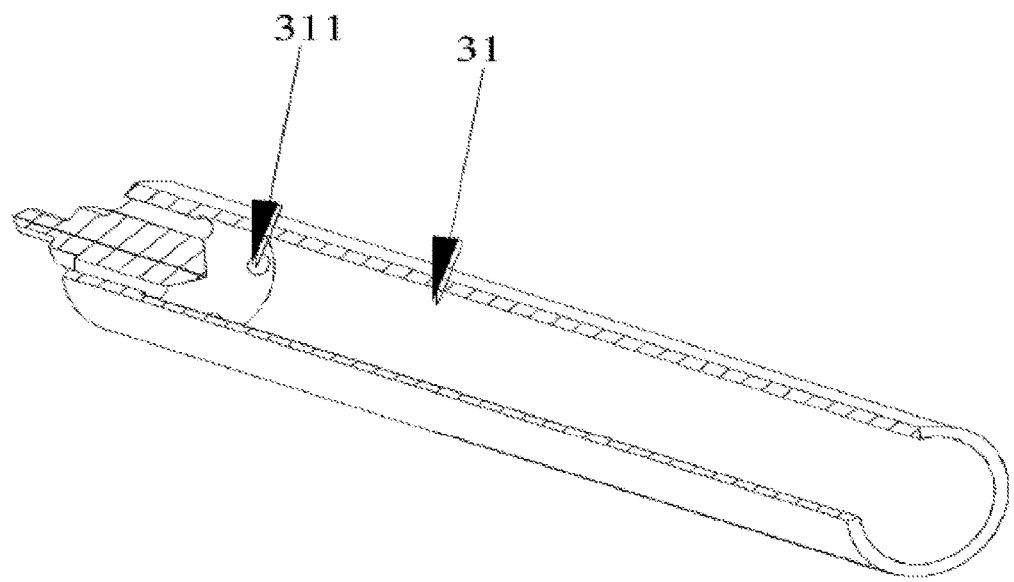
FIG. 3 is a section view of an electronic expansion valve according to an embodiment of the invention.
Figure 6:
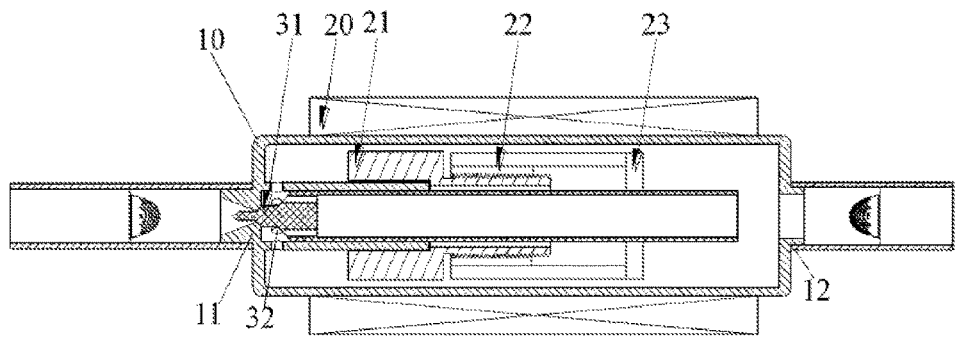
FIG. 6 is a schematic diagram of a normally closed state of a valve needle when an electronic expansion valve does not work according to an embodiment of the invention.
Figure 8:
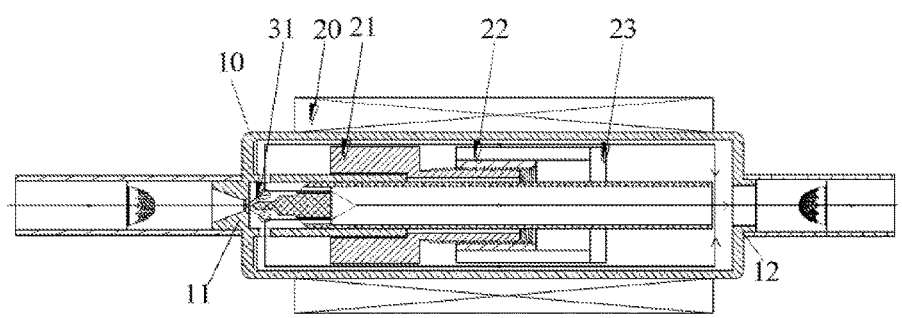
FIG. 8 is a schematic diagram of a liquid flow direction of an electronic expansion valve according to an embodiment of the invention.

As shown in FIG. 3, FIG. 6 and FIG. 8, according to the invention, an electronic expansion valve is provided, which comprises: a valve body 10, a first chamber being formed in the valve body 10, a liquid inlet 11 and a liquid outlet 12 being oppositely provided at two ends of the valve body 10, and the liquid inlet 11 and the liquid outlet 12 being coaxially provided along a central axis of the valve body 10; a coil 20, provided at the outer side of a chamber wall of the first chamber in a sleeving manner; a second chamber, provided in the first chamber, an inlet end of the second chamber being communicated with the liquid inlet 11, an outlet end of the second chamber being communicated with the liquid outlet 12, the inlet end of the second chamber and the outlet end of the second chamber being coaxially provided, and a valve core 31 capable of moving along the central axis being provided in the second chamber; and a first liquid passage hole 33, provided in a chamber wall of the second chamber, the first chamber being communicated with the liquid inlet 11 via the first liquid passage hole 33.

The electronic expansion valve according to the invention is a through electronic expansion valve. A through structure can be directly mounted in a connecting pipe of indoor and outdoor units of an air conditioner refrigerating system. A movement direction of the valve core 31 and flow directions of a coolant inlet and a coolant outlet are in the same straight line. Flowing comprising one-way flowing and two-way flowing is more stable and more uniform. Structures connected to a copper pipe such as "pipe sockets", pipe nuts and pipe joints are provided on an inlet pipe and an outlet pipe, and a structure in direct welded connection with the copper pipe is also included. For example, the pipe joints are provided at one end of the electronic expansion valve, and the "pipe sockets" are provided at the other end of the electronic expansion valve. The through structure can be mounted in the connecting pipe of the indoor and outdoor units of an air conditioner. By keeping a movement direction of liquid in the valve body and an in-out direction of the liquid with respect to the valve body in the straight line, the flow resistance of the liquid and the on-way pressure loss can be effectively reduced. Meanwhile, the noise problem can be solved, the valve is simple to mount, the cost is reduced, and the efficiency is improved.

As shown in FIG. 3, FIG. 6 and FIG. 8, a second liquid passage hole 311 extending in parallel to the central axis is provided in the valve core 31. The valve core 31 is mainly characterized by the second liquid passage hole 311 and a cavity of the valve core 31. The second liquid passage hole 311 in a conical surface of the valve core 31 communicate a coolant inlet pipe with the cavity of the valve core 31. The advantages are as follows. Firstly, when the valve core 31 is opened, a coolant can enter the valve core 31 through the second liquid passage hole 311, thereby quickly balancing the pressures of two ends of the valve core 31, reducing the movement resistance of the valve core 31 and the impact of the coolant on the valve core 31, and making the valve core 31 move more steadily. Secondly, a liquid flow channel can be formed, and due to a straight line type flow mode, the energy loss is extremely low and the noise is lower. Preferably, 2 to 4 second liquid passage holes 311 are symmetrically provided.

As shown in FIG. 6, the electronic expansion valve further comprises a controller, configured to control the magnitude and time of an energizing current of the coil 20. The electronic expansion valve further comprises a stator 21 and a rotor 22 rotating with respect to each other, the stator 21 is provided outside the second chamber, and the valve core 31 is connected to the rotor 22 so as to rotate along with the rotor 22 with respect to the stator 21. The rotor 22 is a permanent magnet rotor. The stator 21 is in thread engagement with the rotor 22. The electronic expansion valve further comprises an end cover plate 23, and the valve core 31 is connected to the rotor 22 via the end cover plate 23. FIG. 1 is a diagram of a normally closed state of a valve core 31 when an electronic expansion valve does not work. A drive mode for the valve core 31 adopts an electromagnetic drive mode. The working process is as follows. When the electronic expansion valve does not work, the coil 20 is de-energized, and the valve core 31 is closed under a self-locking action of threads. When the electronic expansion valve needs to conduct flow adjustment for a system, the coil 20 is energized to control a pulse voltage of a circuit to act on the coil 20 according to a certain logic relationship, the rotor 22 made of a permanent magnet rotates forwardly or reversely under an action of an electromagnetic torque, the valve core 31 moves forwards or backwards by means of the transfer of the threads, and the openness of a valve port is changed, thereby adjusting the flow of the liquid.

Figure 7:
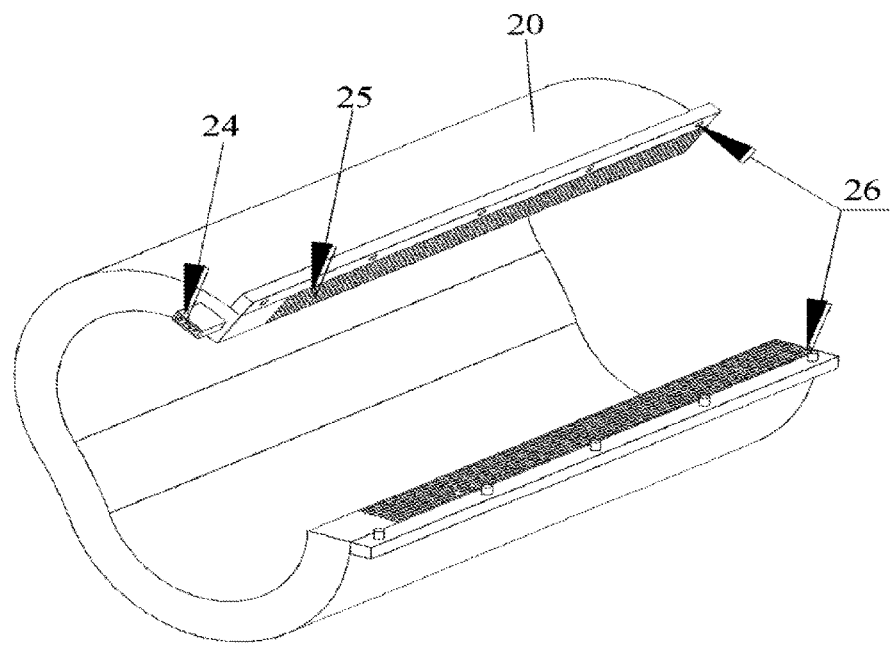
FIG. 7 is a schematic diagram of a coil of an electronic expansion valve according to an embodiment of the invention.

As shown in FIG. 7, the coil of the electronic expansion valve can be in an open type and a dosed type. Preferably, the coil 20 is an open coil. The coil 20 is provided with an insulating layer. The open coil comprises a lead interface 24, the insulating layer 25 and a fixed structure 26. The open structure enables the coil to be simply and conveniently changed in a using process of the electronic expansion valve. The insulating layer may be made of rubber or plastic preferably. When it is necessary to change the coil, the coil is opened by means of elastic deformation of the rubber or the plastic, sleeves outside a housing of the electronic expansion valve, is aligned with a coil interface, and then is locked by the fixed structure 26.

As shown in FIG. 6 and FIG. 8, the liquid inlet 11 and the liquid outlet 12 are each provided with a filter internally. Specifically, each of an inlet pipe and an outlet pipe thereof is provided with a filter apparatus, thereby realizing coolant filtration. The filter apparatuses can be mounted in a pipeline connected to the electronic expansion valve.

As shown in FIG. 6 and FIG. 8, the stator 21 with the threads is fixed to the valve body 10. The valve core 31 is fixedly connected to an assembly of the permanent magnet rotor 22 via the end cover plate 23. The assembly of the permanent magnet rotor 22 and the stator 21 with the threads achieve the movement of the valve core 31 by means of the transfer of the threads.

From the above descriptions, it can be seen that the embodiments of the invention achieve the technical effects as follows.

By keeping the movement direction of the liquid in the valve body and the in-out direction of the liquid with respect to the valve body in the straight line, the flow resistance of the liquid and the on-way pressure loss can be effectively reduced. Meanwhile, the noise problem can be solved, the valve is simple to mount, the cost is reduced, and the efficiency is improved.

The above is only the preferred embodiments of the invention, and is not intended to limit the invention. There can be various modifications and variations in the invention for those skilled in the art. Any modifications, equivalent replacements, improvements and the like within the spirit and principle of the invention shall fall within the protection scope of the invention.

The invention claimed is:

1. An electronic expansion valve, comprising:
   a valve body (10), a first chamber being formed in the valve body (10), a liquid inlet (11) and a liquid outlet (12) being oppositely provided at two ends of the valve body (10), and the liquid inlet (11) and the liquid outlet (12) being coaxially provided along a central axis of the valve body (10);
   a second chamber, provided in the first chamber, a coil (20) being provided in the second chamber;
   a third chamber, running through the second chamber, an inlet end of the third chamber being communicated with the liquid inlet (11), an outlet end of the third chamber being communicated with the liquid outlet (12), the inlet end of the third chamber and the outlet end of the third chamber being coaxially provided, and
   a valve core (31) capable of moving along the central axis being provided in the third chamber; and
   a first liquid passage hole (33), provided in a chamber wall of the third chamber, the first chamber being communicated with the liquid inlet (11) via the first liquid passage hole (33);
   a sliding rail slot (32) is provided in the chamber wall of the third chamber, and the valve core (31) slides along the sliding rail slot (32);
   an oil storage hole (321) is provided in an inner wall of the sliding rail slot (32).

2. The electronic expansion valve according to claim 1, wherein a second liquid passage hole (311) extending in parallel to the central axis is provided in the valve core (31).

3. The electronic expansion valve according to claim 1, wherein a reset spring (36) abutting against the valve core (31) is provided on an inner chamber wall of the third chamber.

4. The electronic expansion valve according to claim 3, wherein a location snap ring (35) configured to locate the reset spring (36) is provided in the third chamber.

5. The electronic expansion valve according to claim 1, wherein an end cover plate (23) is provided at a first end of the second chamber.

6. The electronic expansion valve according to claim 1, wherein a seal ring (34) is provided at the outlet end of the third chamber.

7. The electronic expansion valve according to claim 1, wherein the liquid inlet (11) and the liquid outlet (12) are each provided with a filter internally.

8. The electronic expansion valve according to claim 1, further comprising a controller, configured to control a magnitude and a time of an energizing current of the coil (20).

* * * * *